No. 656,297. Patented Aug. 21, 1900.
A. R. MORRIS.
GRANULATING MACHINE.
(Application filed Jan. 22, 1900.)
(No Model.) 2 Sheets—Sheet 1.
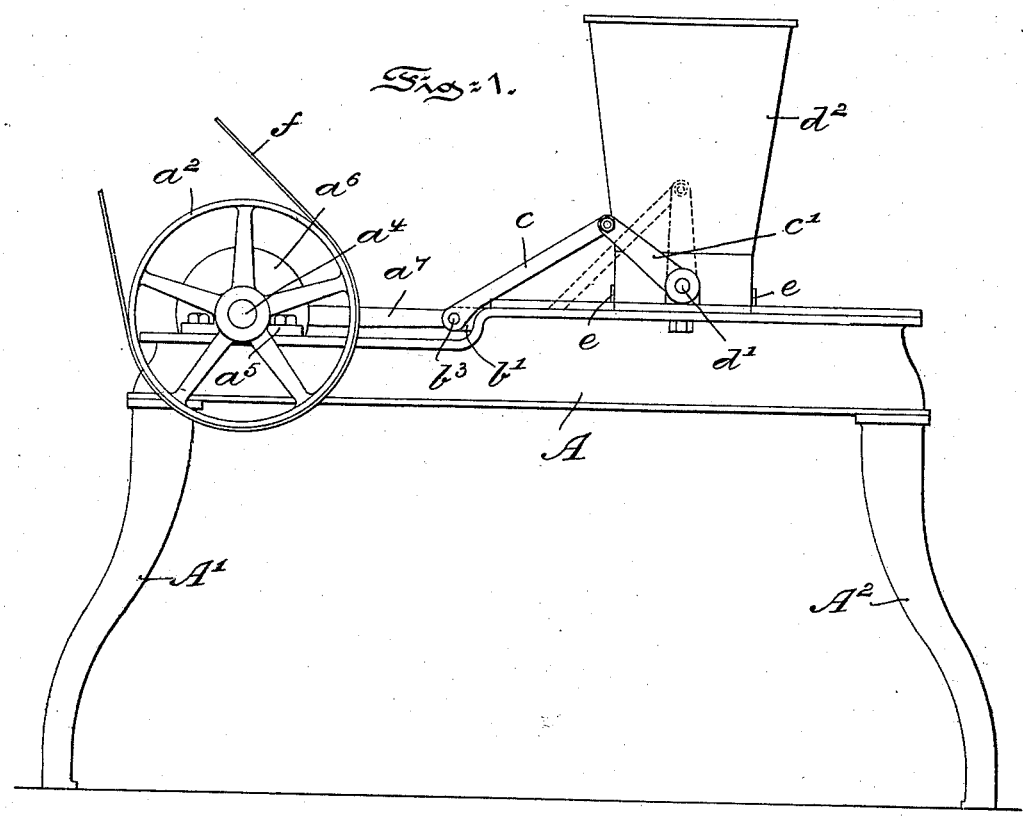
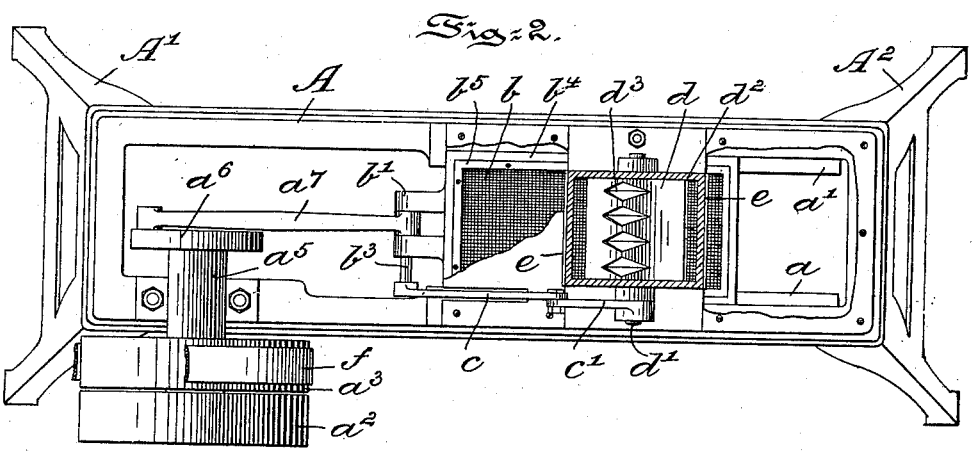
Witnesses:
Thomas M. Smith
Richard C. Maxwell
Inventor:
Abraham R. Morris
By J. Walter Douglass
Attorney No. 656,297. Patented Aug. 21, 1900.
A. R. MORRIS.
GRANULATING MACHINE.
(Application filed Jan. 22, 1900.)
(No Model.) 2 Sheets—Sheet 2.
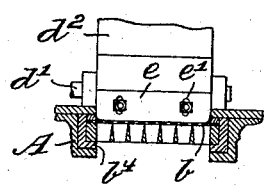
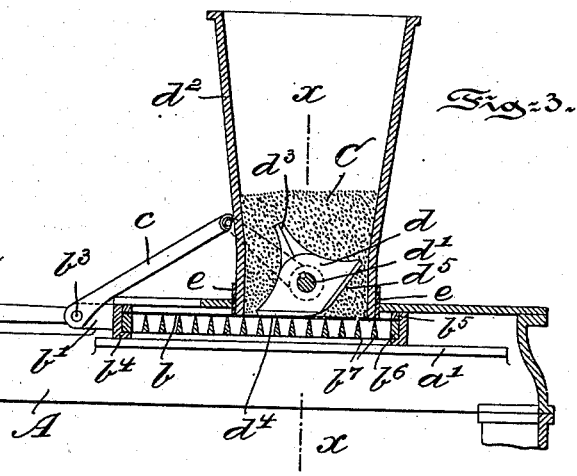
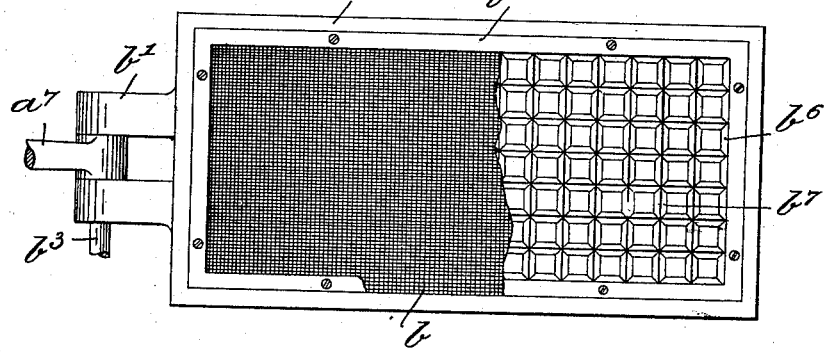
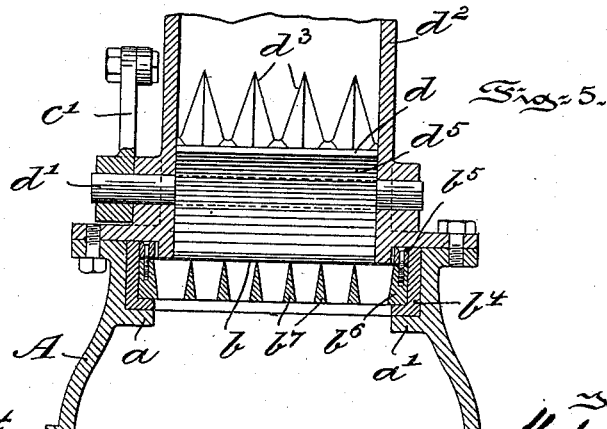
Witnesses:
Thomas M. Smith
Richard C. Maxwell
Inventor:
Abraham R. Morris,
By J. Walter Douglas
Attorney

UNITED STATES PATENT OFFICE.

ABRAHAM ROWLAND MORRIS, OF PHILADELPHIA, PENNSYLVANIA, ASSIGNOR TO THE MORRIS TABLET MACHINE COMPANY, OF SAME PLACE AND CAMDEN, NEW JERSEY.

GRANULATING-MACHINE.

SPECIFICATION forming part of Letters Patent No. 656,297, dated August 21, 1900.

Application filed January 22, 1900. Serial No. 2,272. (No model.)

*To all whom it may concern:*

Be it known that I, ABRAHAM ROWLAND MORRIS, a citizen of the United States, residing at the city of Philadelphia, in the county of Philadelphia and State of Pennsylvania, have invented certain new and useful Improvements in Granulators, of which the following is a specification.

My invention has relation to an apparatus for mechanically transforming plastic or semiplastic materials into granules or into a granulated condition, and in such connection it relates to the construction and arrangement of such apparatus for said purpose.

The principal object of my invention is to provide a comparatively simple, durable, and effective apparatus wherein plastic or semiplastic materials can be mechanically granulated.

Heretofore in the manufacture of pharmaceutical and similar preparations the dough-like or semiplastic materials have been granulated manually, as follows: A small portion of the mass was placed in a basin or receptacle having a sieve-like base and the mass forced through the meshes and cut off by the pressure and movement of the hand of the operator. Such a method of procedure was not only uncleanly, but very slow and exceedingly laborious and expensive.

My present invention consists of a machine for granulating plastic or semiplastic materials wherein a sieve is reciprocated mechanically in one plane and the material fed to and through the meshes of the sieve by a feeding mechanism which mechanically takes the place of the operator's hand in the old method.

My invention, stated in general terms, consists of a granulator constructed and arranged in substantially the manner hereinafter described and claimed.

The nature and scope of my invention will be more fully understood from the following description, taken in connection with the accompanying drawings, forming part hereof, in which—

Figure 1 is a side elevational view of a granulator embodying the general features of my invention. Fig. 2 is a top or plan view of the same, partially sectioned. Fig. 3 is a view, partly in longitudinal section and partly in elevation, of an apparatus embodying the characteristic features of my invention. Fig. 4 is a top or plan view enlarged, partly in broken sections, of the sieve or screen of the apparatus. Fig. 5 is a vertical sectional view through the apparatus on the line $xx$ of Fig. 3, and Fig. 6 is an end view of one of the scraping devices adjustably secured to the hopper and adapted to contact with the surface of the sieve or screen to maintain said plate in a cleanly condition during actuation of the machine.

Referring to the drawings, A represents the bed of the machine, provided with legs $A'$ $A^2$ and with two longitudinal rails $a$ and $a'$ on the inner sides of the bed, below the top, for supporting the sieve or screen $b$, which travels to and fro in one plane upon the same.

$a^2$ and $a^3$ are loose and fast pulleys mounted on a shaft $a^4$, which is held in a bearing $a^5$, suitably secured to the top of the bed A. This shaft carries a crank-disk $a^6$, located in an opening provided in the top of the machine.

$a^7$ is a rod one end of which is connected with the crank-pin of the disk $a^6$ and the other end to a journal $b^3$, held in the bearings $b'$ of a rectangular frame $b^4$.

$b^5$ and $b^6$ are the inner frames between which the sieve or screen $b$ is mounted, the lower frame $b^6$ being provided with a grated body $b^7$, formed of wedge-shaped slats or bars crossing each other, as illustrated in Figs. 4 and 5. Upon the knife-like upper edges of the slats or bars of the body $b^7$ the sieve or screen $b$ is supported, the edges of the slats or bars coinciding with certain of the crossing strands of the sieve, so as to not only prevent sagging of the sieve, but also to present no obstruction to the openings or meshes of the sieve. A link $c$ and an arm $c'$ are connected, respectively, with each other and with the journal $b^3$ and one end of the shaft $d'$ of a feeder and presser $d$, mounted within a hopper $d^2$, suitably fitted to the bed A. The device $d$ is provided with fingers or projections $d^3$ for loosening or breaking up the material in the hopper $d^2$ and also aiding in the feeding of the material therein from said hopper and with angular faces $d^4$ and $d^5$, adapted to alternately contact with the surface of the sieve or screen $b$ in its to and fro movements with sufficient pressure to force the material contained in the hopper $d^2$ through the meshes of the sieve or screen $b$. The hopper at each end is provided with an adjustable plate or scraper $e$ by means of tightening screw-bolts $e'$. The reciprocating or traveler sieve or screen frame is so arranged as that sieves of different degrees of mesh may be readily inserted for producing granules of varying size, according to requirements.

The mode of operation of the apparatus hereinbefore described is as follows: The plastic or semiplastic material C is placed in the hopper $d^2$ and the belt $f$ is shifted from the loose pulley $a^2$ to the fast pulley $a^3$ to start the machine, which imparts motion to the disk $a^6$, mounted on the shaft $a^4$, which motion is communicated by the connecting-rod $a^7$ through the said disk to the traveler-sieve frame $b^4$ to cause the sieve to be moved back and forth, and at the same time the said motion causes the feeder and presser device $d$, mounted in the hopper $d^2$, to be reciprocated or rocked back and forth to feed the material in the hopper downward and to force the same with the requisite degree of pressure against the meshes of the traveler sieve or screen $b$ and through the same, whereby it is transformed into granules or caused to assume a granulated form and falling into a suitable receptacle. (Not shown, but which may be placed underneath the machine to receive the material in such form for subsequent use.) During the travel of the sieve or screen $b$ the scrapers $e$, adjustably connected with the hopper $d^2$, will maintain the same comparatively clear of any clogging or accumulation of material over the face and in the meshes of the sieve, thereby insuring a uniform granulation of the material in the delivery of the same from the machine. By arranging the screen or sieve $b$ so as to be readily removable sieves of different mesh may be readily introduced for obtaining different kinds of granulation of materials. The feeding and pressing device $d$ not only forces the material through the meshes of the sieve, but it also rocks in a direction contrary to the line of travel of the sieve, thus serving to hold the material so that it may be cut up by the strands of the sieve. Thus when the sieve is traveling from right to left the left-hand angular face $d^4$ is forced down and from the left-hand to the right-hand end of the machine, and when the sieve is traveling in the opposite direction the other angular face $d^5$ is forced down and toward the left-hand end of the machine.

Having thus described the nature and objects of my invention, what I claim as new, and desire to secure by Letters Patent, is—

1. A mechanical granulator for plastic or similar material, comprising a hopper or receptacle having an open base, a bed upon which the base of the hopper is supported, an open-meshed sieve, means for maintaining said sieve in substantially-flat condition in said bed and across the base of the hopper, means for reciprocating said sieve in said bed across the open base of the hopper, and means located within the hopper for feeding and forcing the material in the hopper toward and through the meshes of the sieve during the reciprocation of said sieve, substantially as and for the purposes described.

2. In a mechanical granulator of the character described, an open-meshed sieve, a grated body upon which said sieve is supported, said body comprising cross-bars having upper knife-like edges adapted to rest under the strands of the sieve, and a frame adapted to clamp the sieve down upon said body, substantially as and for the purposes described.

3. In a mechanical granulator of the character described, a combined feeding and forcing mechanism, in combination with a reciprocatory open-meshed sieve, and means for reciprocating said sieve, said feeding and forcing mechanism adapted to present and force the material to and through the meshes of the sieve, during the reciprocation of said sieve, substantially as and for the purposes described.

4. In a mechanical granulator, a reciprocatory open-meshed sieve, an open-ended hopper across the open base whereof the sieve is adapted to be reciprocated, a feeding mechanism having two faces adjacent to and normally arranged at an angle to the sieve, and means for oscillating the feeding mechanism so as to cause each face to alternately approach the sieve, substantially as and for the purposes described.

5. In a mechanical granulator, a feeding mechanism having two angular under faces, a hopper wherein said feeding mechanism is pivotally supported, means for oscillating said feeding mechanism in said hopper to alternately bring an under face toward the base of said hopper, a sieve, and means for reciprocating said sieve across the base of said hopper and in a direction opposite to the direction of travel of the feeding mechanism, substantially as and for the purposes described.

6. In a mechanical granulator, a combined feeding, pressing and disintegrating mechanism, comprising an oscillating body having two angular under faces and upwardly-projecting fingers, substantially as and for the purposes described.

In testimony whereof I have hereunto set my signature in the presence of two subscribing witnesses.

ABRAHAM ROWLAND MORRIS.

Witnesses:
   J. WALTER DOUGLASS,
   RICHARD C. MANUELL.